United States Patent
Rassam et al.

(10) Patent No.: US 11,221,033 B2
(45) Date of Patent: Jan. 11, 2022

(54) SINGLE-PIECE FASTENER

(71) Applicant: Newfrey LLC, New Britain, CT (US)

(72) Inventors: Najwan Rassam, Troy, MI (US); Tien T. Diep, West Bloomfield Township, MI (US); Roger Pilon, New Baltimore, MI (US); Andrew C. Heidacker, Commerce Township, MI (US); Oday Amer Safry, Farmington Hills, MI (US); Jason A. Meyers, Shelby Township, MI (US); Ryan Ostach, Commerce Township, MI (US); Steven M. Benedetti, Sterling Heights, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 17/149,056

(22) Filed: Jan. 14, 2021

(65) Prior Publication Data

US 2021/0140457 A1    May 13, 2021

Related U.S. Application Data

(60) Division of application No. 16/807,916, filed on Mar. 3, 2020, now Pat. No. 10,941,796, which is a
(Continued)

(51) Int. Cl.
*F16B 5/06* (2006.01)
*F16B 21/07* (2006.01)

(52) U.S. Cl.
CPC ............ *F16B 5/0657* (2013.01); *F16B 5/065* (2013.01); *F16B 21/076* (2013.01)

(58) Field of Classification Search
CPC ...... F16B 5/0657; F16B 5/065; F16B 21/076; F16B 21/09; F16B 21/073; F16B 21/086
See application file for complete search history.

(56) References Cited

U.S. PATENT DOCUMENTS

| 3,551,963 A | 1/1971 | Mosher, Jr. et al. |
| 3,577,603 A * | 5/1971 | Seckerson ............... F16B 5/065 411/510 |

(Continued)

FOREIGN PATENT DOCUMENTS

| DE | 10053200 A1 | 5/2002 |
| DE | 202008000274 U1 | 6/2008 |

(Continued)

OTHER PUBLICATIONS

Invitation to Pay Additional Fees and Partial International Search in corresponding International Patent Application No. PCT/US2020/040628 dated Oct. 6, 2020.

*Primary Examiner* — David M Upchurch
(74) *Attorney, Agent, or Firm* — Harness, Dickey & Pierce, P.L.C.

(57) ABSTRACT

Aperture retention arms can extend outwardly away from an aperture shaft. An insertion end can be positioned below the aperture retention arms and can have an overall conical shape. The insertion end can include an opening having a closed interior terminal end separating a portion of a first lateral half of the insertion end and leaving another portion of the first lateral half as a connecting bridge below one of the aperture retention arms. The opening can include a channel extending from the closed interior terminal end to an open exterior terminal end to separate a second lateral half of the insertion end below another of the aperture retention arms. The insertion end below the open exterior terminal end of the channel can extend laterally outwardly beyond a straight exterior line defined by laterally outermost points of an outer longitudinal side of the second aperture retention arm.

15 Claims, 20 Drawing Sheets

Related U.S. Application Data continuation-in-part of application No. 16/509,270, filed on Jul. 11, 2019, now Pat. No. 10,989,239.

(56) References Cited

U.S. PATENT DOCUMENTS

| | | | |
|---|---|---|---|
| 3,722,037 | A | 3/1973 | Jaeger |
| 4,176,428 | A | 12/1979 | Kimura |
| 4,668,145 | A | 5/1987 | Hirohata |
| 4,778,320 | A * | 10/1988 | Nakama ............... F16B 5/065 24/297 |
| 5,168,604 | A | 12/1992 | Boville |
| 5,217,337 | A | 6/1993 | Junemann et al. |
| 5,507,610 | A | 4/1996 | Benedetti et al. |
| 5,647,713 | A | 7/1997 | Ge et al. |
| 5,975,820 | A | 11/1999 | Kirchen |
| 6,594,870 | B1 | 7/2003 | Lambrecht et al. |
| 6,715,185 | B2 | 4/2004 | Angellotti |
| 7,017,239 | B2 | 3/2006 | Kurily et al. |
| 7,073,230 | B2 | 7/2006 | Boville |
| 7,257,867 | B2 | 8/2007 | Mizukoshi et al. |
| 7,549,199 | B2 | 6/2009 | Bugner |
| 7,862,275 | B2 | 1/2011 | Jatzke |
| 8,316,514 | B2 * | 11/2012 | Sano ............... B60R 13/0206 24/297 |
| 8,322,001 | B2 | 12/2012 | Ehrhardt et al. |
| 8,585,121 | B2 | 11/2013 | Marx et al. |
| 8,671,527 | B2 * | 3/2014 | Scroggie ............ F16B 21/082 24/297 |
| 8,701,246 | B2 * | 4/2014 | Allen ................. A61B 50/20 16/2.1 |
| 8,997,316 | B2 | 4/2015 | Loewe et al. |
| 9,145,909 | B2 * | 9/2015 | Lepper ................. F16B 21/082 |
| 9,939,003 | B2 * | 4/2018 | Ormsby ............... F16B 21/086 |
| 10,099,628 | B2 | 10/2018 | Kato et al. |
| 2004/0016088 | A1 * | 1/2004 | Angellotti ............ F16B 5/0657 24/297 |
| 2004/0052609 | A1 * | 3/2004 | Kraus ................... F16B 5/123 411/353 |
| 2005/0034282 | A1 * | 2/2005 | Kurily ................. F16B 21/084 24/297 |
| 2005/0079033 | A1 * | 4/2005 | Benedetti ............ F16B 21/086 411/508 |
| 2006/0242802 | A1 * | 11/2006 | Scroggie ............. F16B 5/0657 24/297 |
| 2007/0166127 | A1 * | 7/2007 | Scroggie ............. F16B 21/20 411/508 |
| 2008/0066266 | A1 | 3/2008 | Scroggie et al. |
| 2011/0123294 | A1 | 5/2011 | Kempf et al. |
| 2011/0154621 | A1 | 6/2011 | Ehrhardt et al. |

FOREIGN PATENT DOCUMENTS

| | | |
|---|---|---|
| DE | 202008006958 U1 | 10/2008 |
| DE | 202008009210 U1 | 12/2008 |
| DE | 102016011744 B3 | 2/2018 |
| EP | 0641939 A1 | 3/1995 |
| JP | 2019/019835 A | 2/2019 |
| WO | WO-2009/029478 A1 | 3/2009 |
| WO | WO-2010/121745 A1 | 10/2010 |
| WO | WO-2012/149117 A1 | 11/2012 |
| WO | WO-2019/035273 A1 | 2/2019 |

* cited by examiner

SINGLE-PIECE FASTENER

CROSS-REFERENCE TO RELATED APPLICATIONS

This application is a divisional of U.S. patent application Ser. No. 16/807,916 filed on Mar. 3, 2020 (now U.S. patent Ser. No. 10/941,796, issued Mar. 9, 2021), which is a continuation-in-part of U.S. patent application Ser. No. 16/509,270 filed on Jul. 11, 2019. The entirety of each of the above applications is incorporated herein by reference.

FIELD

The present disclosure relates to a fastener designed to join a panel having a doghouse to a support having an aperture therein.

BACKGROUND

This section provides background information related to the present disclosure which is not necessarily prior art.

Existing two-piece fastener assemblies designed to join a panel having a doghouse to a support having an aperture therein typically require a relatively large amount of clearance between the doghouse and the support. In some automotive applications, there is not enough clearance to accommodate such existing two-piece fastener assemblies. In addition, such automotive applications can require relatively coupling and uncoupling forces between the two pieces of the fastener that remain consistent to allow repeated access behind the panel.

SUMMARY

This section provides a general summary of the disclosure, and is not a comprehensive disclosure of its full scope or all of its features.

In one aspect of the present disclosure, a two-piece fastener assembly designed to join a panel having a doghouse to a support having an aperture therein is provided. The two-piece fastener assembly includes a doghouse fastener piece and an aperture fastener piece. The doghouse fastener piece can have a doghouse head designed to couple the doghouse fastener to the doghouse and a doghouse shaft extending from the doghouse head. The aperture fastener piece can have an intermediate head and an aperture shaft extending from a side of the intermediate head. A plurality of aperture retention arms can extend outwardly away from the aperture shaft and can be designed to retain the support between the aperture retention arms and the intermediate head. A receiver can include an annular wall extending from a base, and a plurality of plate retention surfaces facing toward the base and being supported by and positioned inwardly of the annular wall. The receiver can extend from a first of an opposite side of the intermediate head as part of the aperture fastener piece, and the doghouse shaft as part of the doghouse fastener piece. A coupling plate can be engaged and retained by the plurality of plate retention surfaces within the receiver to couple the doghouse fastener piece and the aperture fastener piece together. The coupling plate can extend from a second of the opposite side of the intermediate head as part of the aperture fastener piece, and the doghouse shaft as part of the doghouse fastener piece. One of the receiver and the coupling plate can provide the flexibility necessary to couple and uncouple the coupling plate and the receiver together, which correspondingly couples and uncouples the doghouse fastener piece and the aperture fastener piece together.

In another aspect of the present disclosure, a two-piece fastener assembly designed to join a panel having a doghouse to a support having an aperture therein is provided. The two-piece fastener assembly includes a doghouse fastener piece and an aperture fastener piece. The doghouse fastener piece can have a doghouse head designed to couple the doghouse fastener to the doghouse and a doghouse shaft extending from the doghouse head. The doghouse fastener piece can have a receiver including an annular wall extending from a base having a plate shape. The base of the receiver can be supported by the doghouse shaft, and the receiver can have a plurality of plate retention surfaces supported by and positioned inwardly of the annular wall and facing toward the base. The aperture fastener piece can have an intermediate head and an aperture shaft extending from a side of the intermediate head. A plurality of aperture retention arms can extend outwardly away from the aperture shaft and can be designed to retain the support between the aperture retention arms and the intermediate head. The aperture fastener piece can have a plate shaft extending from an opposite side of the intermediate head and a coupling plate supported by the plate shaft. The coupling plate can be engaged and retained by the plurality of plate retention surfaces within the receiver to couple the doghouse fastener piece and the aperture fastener piece together. The annular wall of the receiver can include a plurality of wall segments separated by gaps therebetween. The wall segments can flexibly support the plate retention surfaces of the receiver to provide the flexibility necessary to couple and uncouple the coupling plate and the receiver together, which correspondingly couples and uncouples the doghouse fastener piece and the aperture fastener piece together.

In another aspect of the present disclosure, a single-piece W-base fastener can include a head with an aperture shaft extending from a side of the head. A plurality of aperture retention arms can extend outwardly away from the aperture shaft. An insertion end can be positioned below the aperture retention arms and can have an overall conical shape. The insertion end can include an opening therethrough. The opening can have a closed interior terminal end positioned to separate a first portion of a first lateral half of the insertion end and to leave a second portion of the first lateral half of the insertion end as a connecting bridge below a first of the aperture retention arms. The opening can include a channel extending from the closed interior terminal end to an open exterior terminal end to separate a second lateral half of the insertion end below a second of the aperture retention arms. The insertion end below the open exterior terminal end of the channel can extend laterally outwardly beyond a straight exterior line defined by laterally outermost points of an outer longitudinal side of the second aperture retention arm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
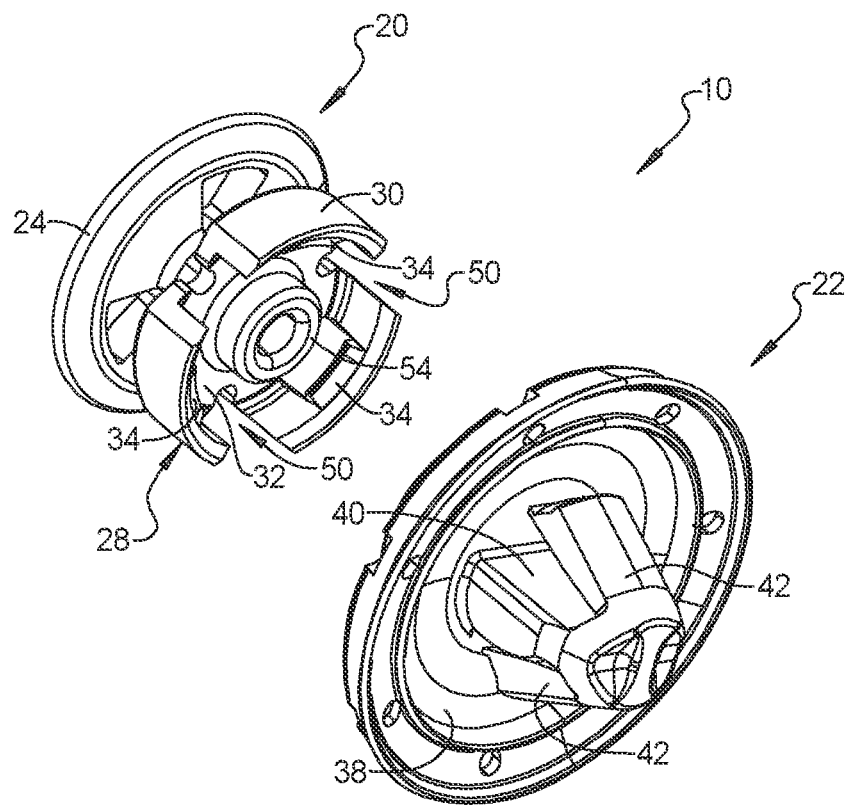
FIG. 1 is a perspective view of one example two-piece fastener assembly in accordance with the present disclosure, with the pieces uncoupled from each other.
Figure 2:
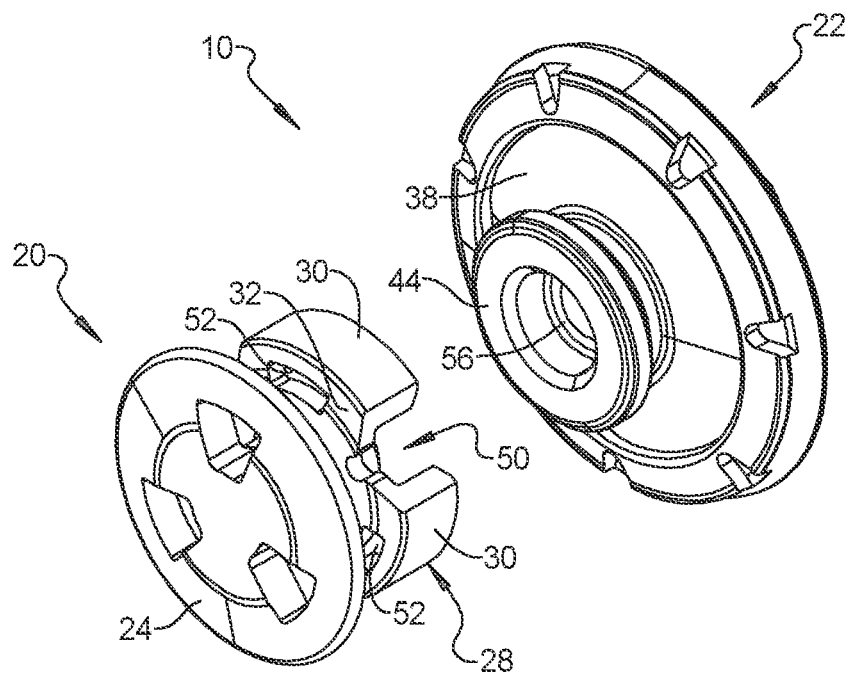
FIG. 2 is another perspective view of the example two-piece fastener assembly of FIG. 1, with the pieces uncoupled from each other.
Figure 3:
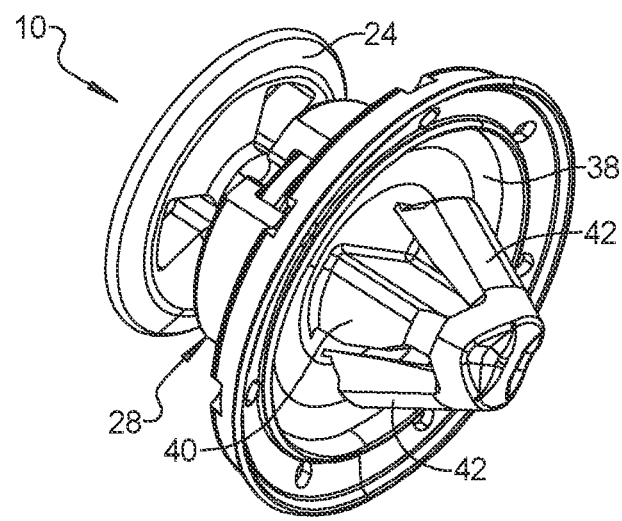
FIG. 3 is a perspective view of the example two-piece fastener assembly of FIG. 1, with the pieces uncoupled from each other.
Figure 4:
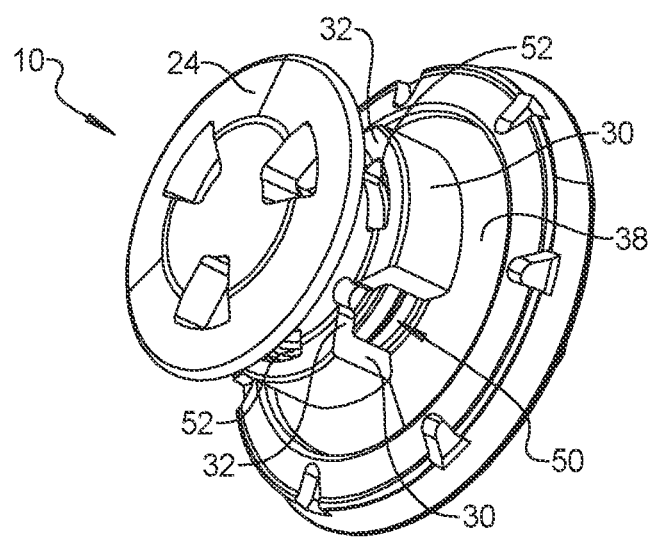
FIG. 4 is another perspective view of the example two-piece fastener assembly of FIG. 1, with the pieces coupled to each other.
Figure 5:
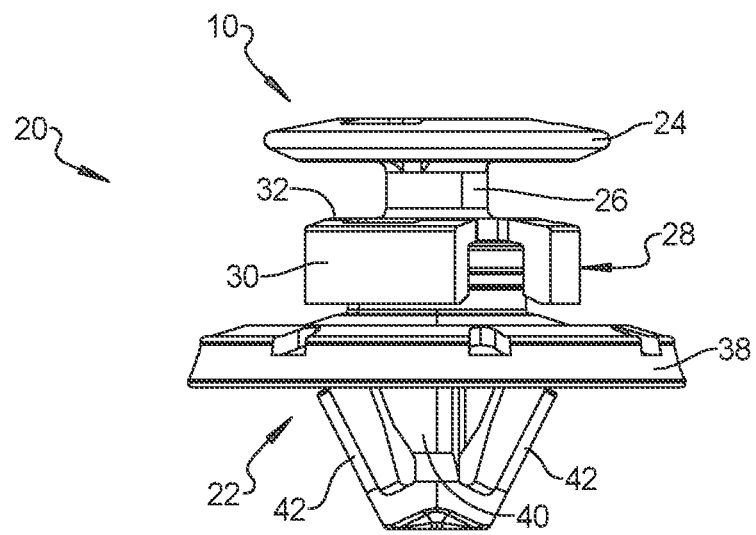
FIG. 5 is a side elevation view of the example two-piece fastener assembly of FIG. 1, with the pieces coupled to each other.
Figure 6:
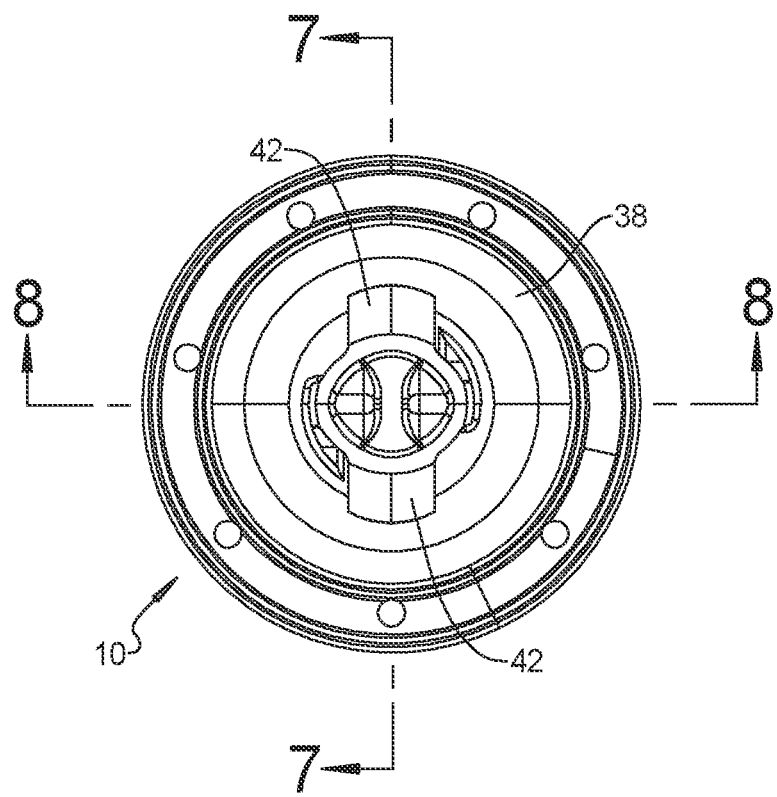
FIG. 6 is a bottom plan view of the example two-piece fastener assembly of FIG. 1.
Figure 7:
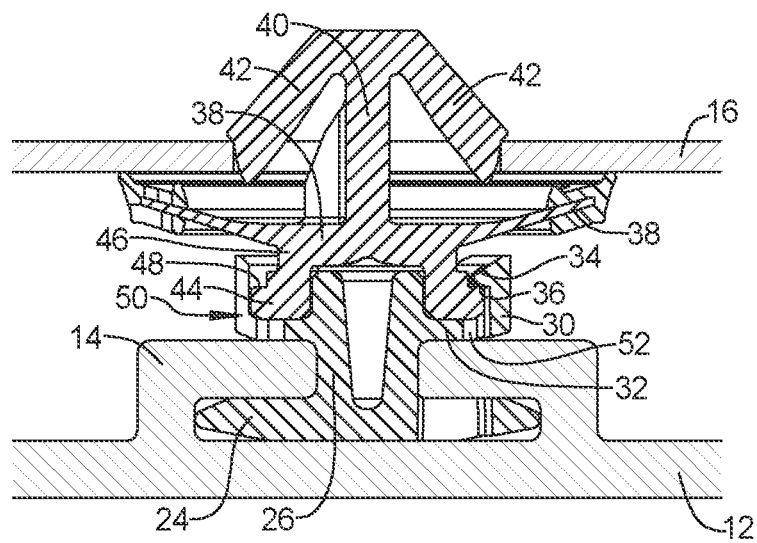
FIG. 7 is a cross-sectional view taken along line 7-7 of FIG. 6 with a portion of the panel and support.
Figure 8:
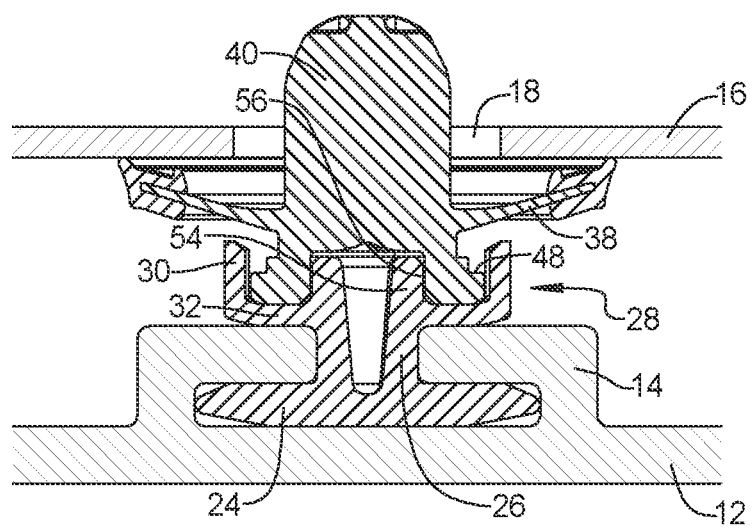
FIG. 8 is a cross-sectional view taken along line 8-8 of FIG. 6 with a portion of the panel and support.
Figure 9:
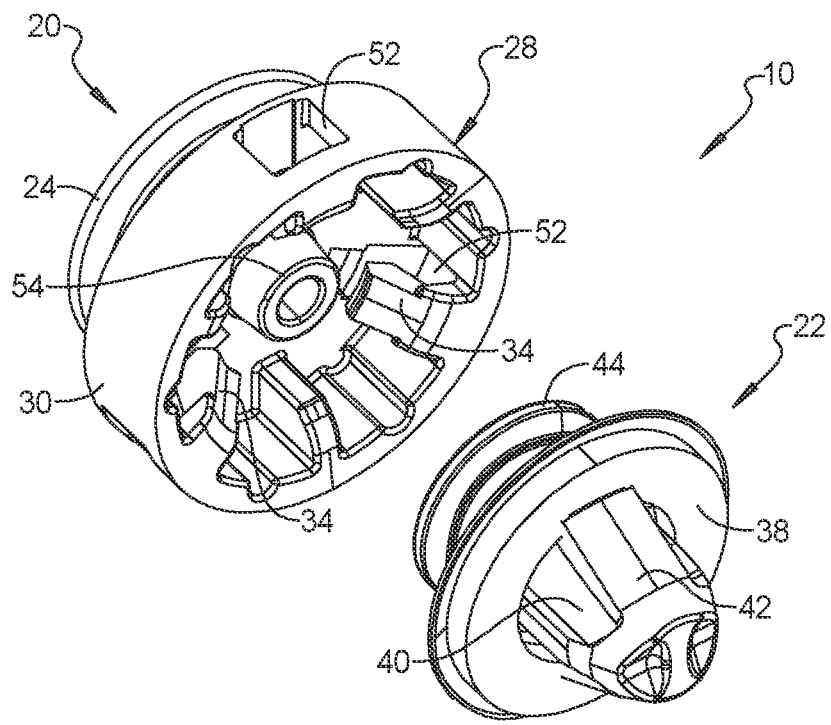
FIG. 9 is a perspective view of a second example two-piece fastener assembly in accordance with the present disclosure, with the pieces uncoupled from each other.
Figure 10:
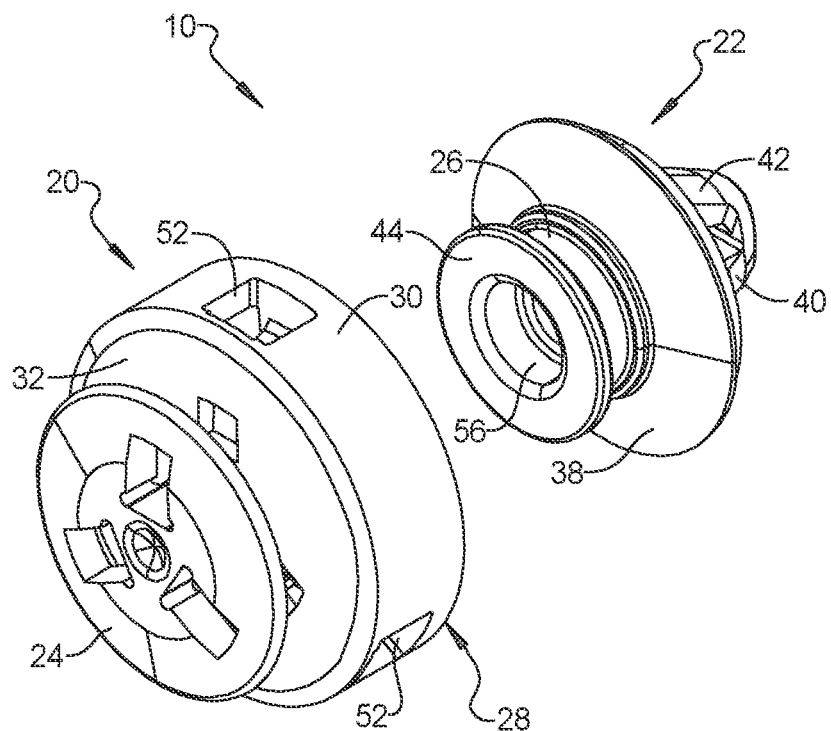
FIG. 10 is another perspective view of the example two-piece fastener assembly of FIG. 9, with the pieces uncoupled from each other.
Figure 11:
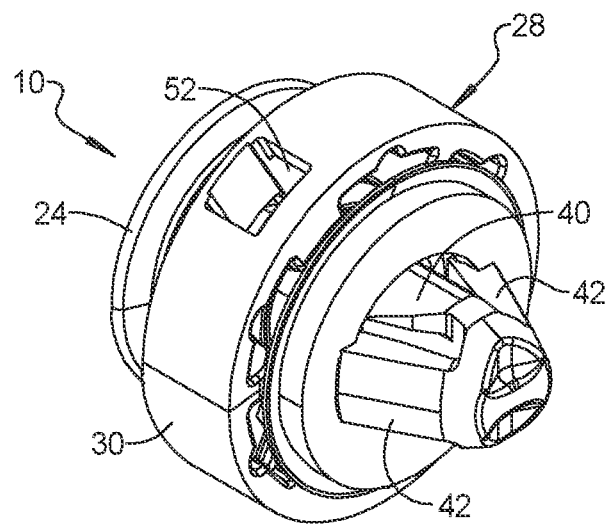
FIG. 11 is a perspective view of the example two-piece fastener assembly of FIG. 9, with the pieces coupled to each other.
Figure 12:
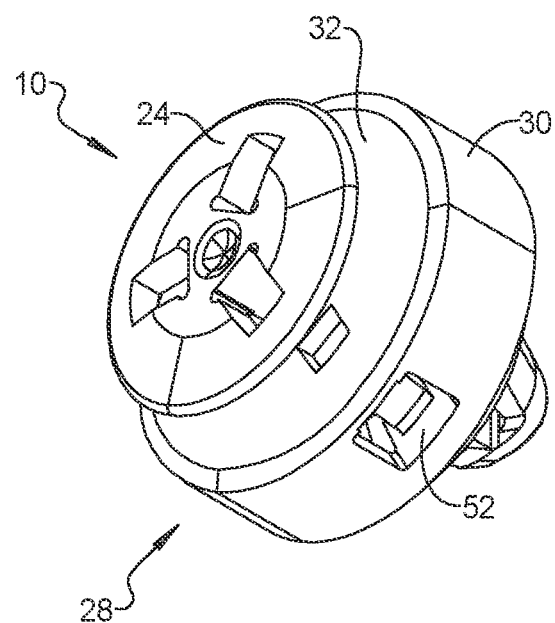
FIG. 12 is another perspective view of the example two-piece fastener assembly of FIG. 9, with the pieces coupled to each other.
Figure 13:
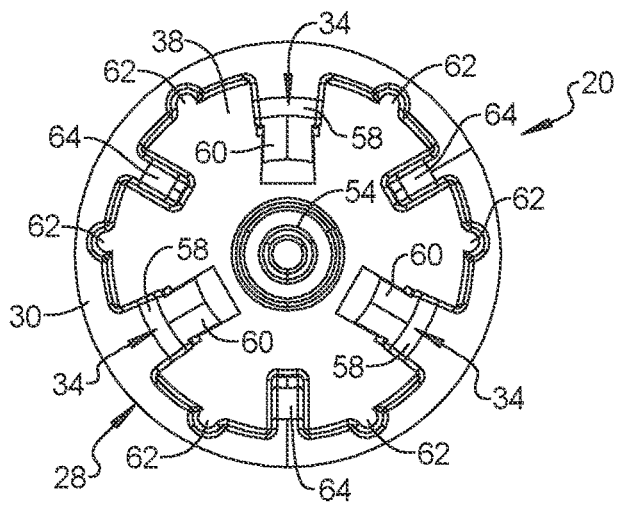
FIG. 13 is a bottom plan view of the example doghouse fastener piece of FIG. 9.
Figure 14:
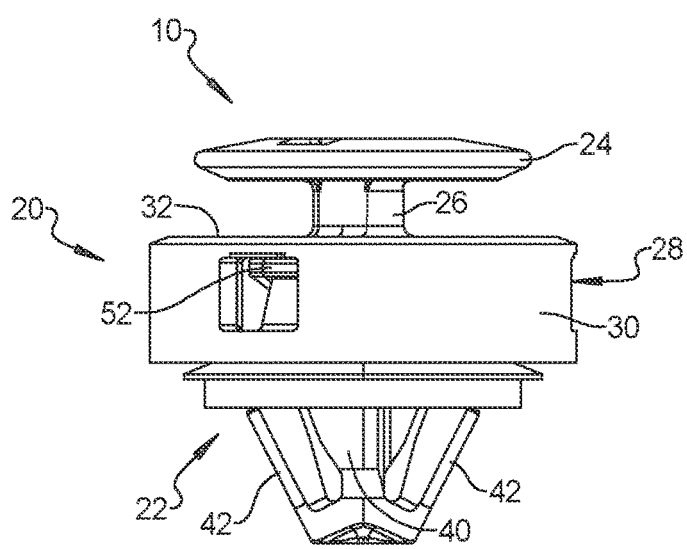
FIG. 14 is a side elevation view of the example two-piece fastener assembly of FIG. 9.
Figure 15:
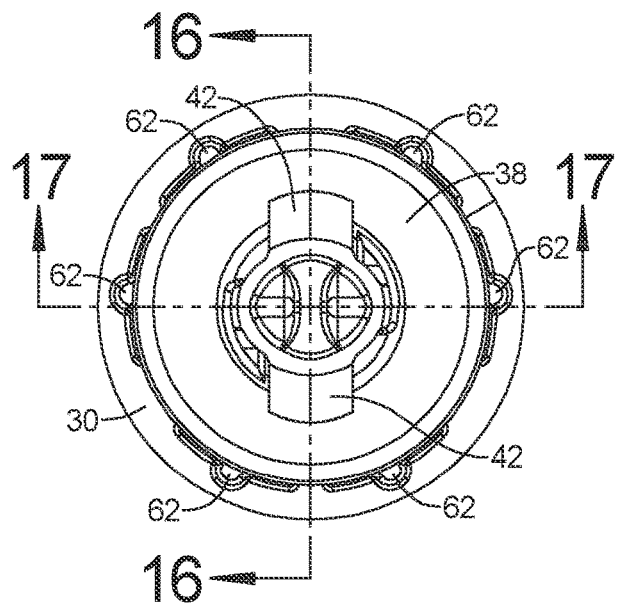
FIG. 15 is a bottom plan view of the example two-piece fastener assembly of FIG. 9.
Figure 16:
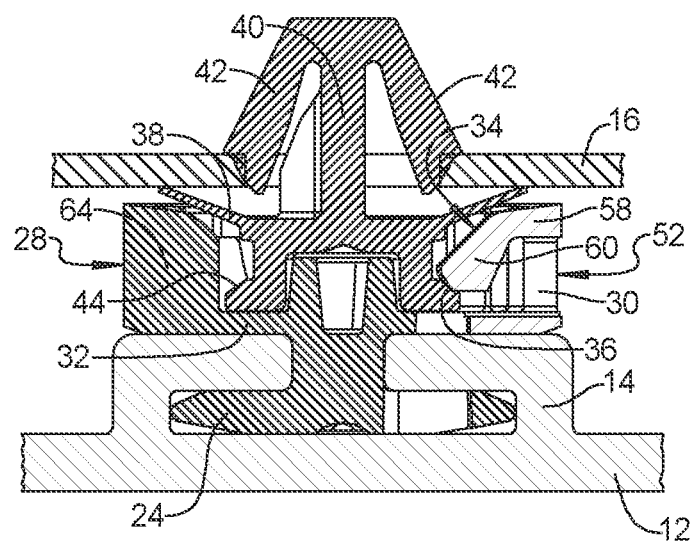
FIG. 16 is a cross-sectional view taken along line 16-16 of FIG. 15 with a portion of the panel and support.
Figure 17:
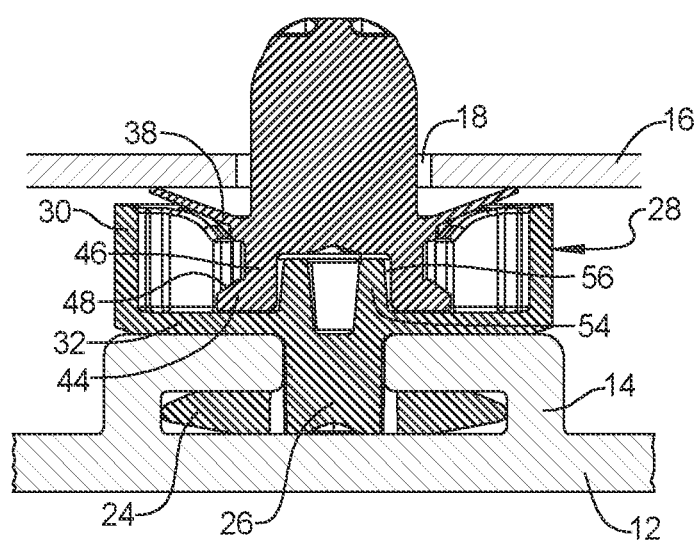
FIG. 17 is a cross-sectional view taken along line 17-17 of FIG. 15 with a portion of the panel and support.
Figure 18:
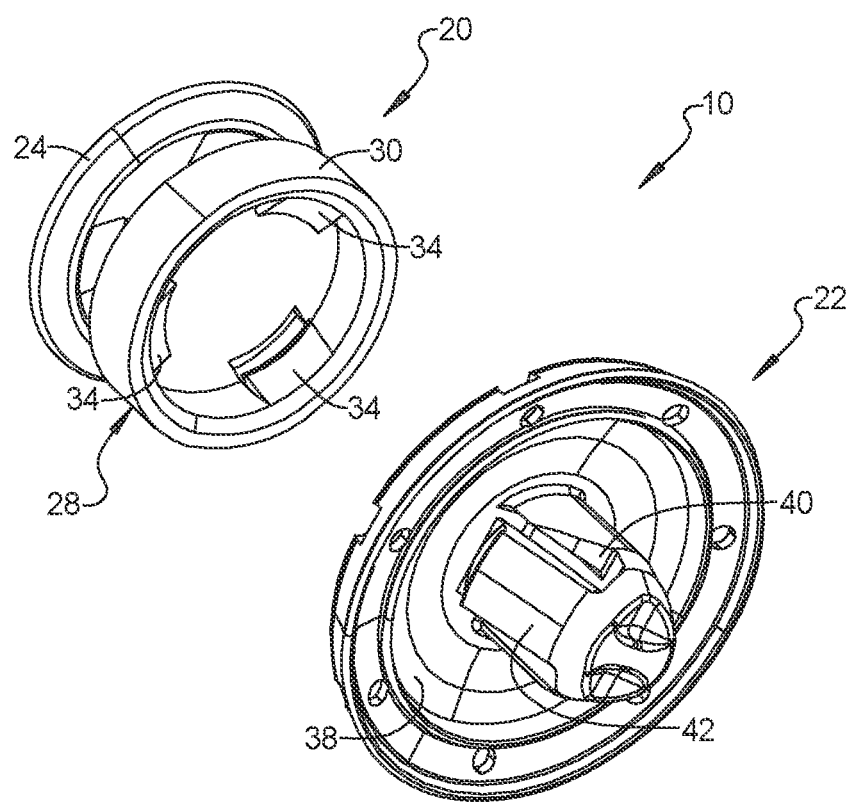
FIG. 18 is a perspective view of a third example two-piece fastener assembly in accordance with the present disclosure, with the pieces uncoupled from each other.
Figure 19:
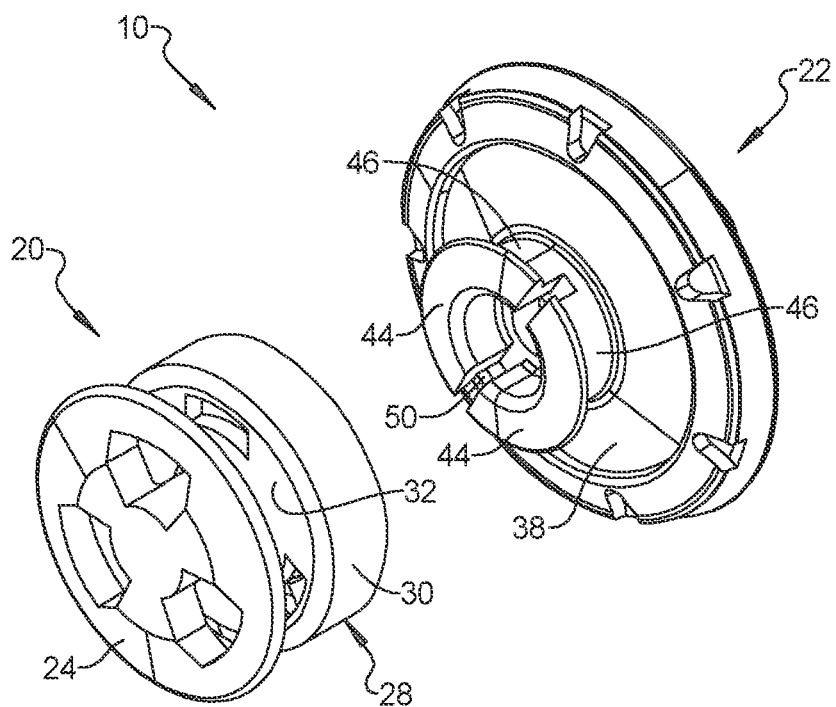
FIG. 19 is another perspective view of the example two-piece fastener assembly of FIG. 18, with the pieces uncoupled from each other.
Figure 20:
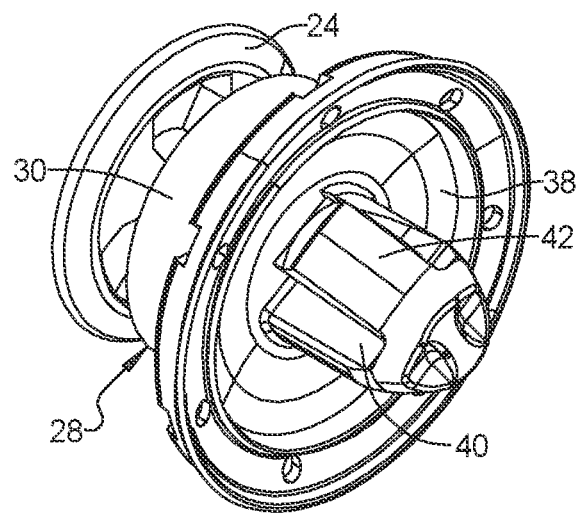
FIG. 20 is a perspective view of the example two-piece fastener assembly of FIG. 18, with the pieces coupled to each other.
Figure 21:
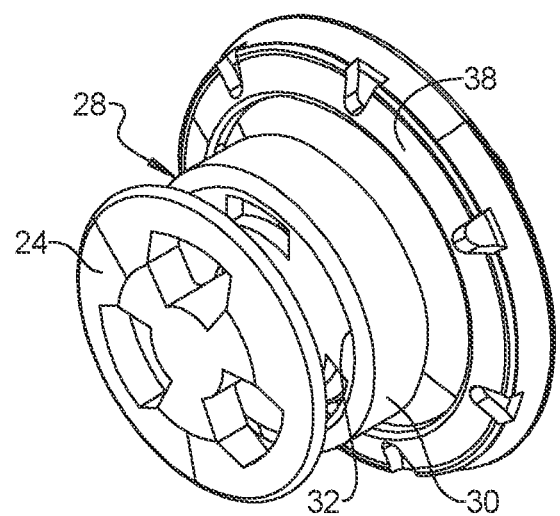
FIG. 21 is another perspective view of the example two-piece fastener assembly of FIG. 18, with the pieces coupled to each other.
Figure 22:
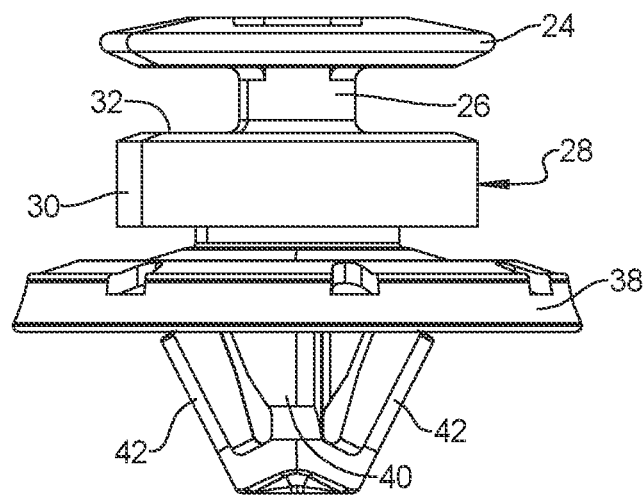
FIG. 22 is a side elevation view of the example two-piece fastener assembly of FIG. 18.
Figure 23:
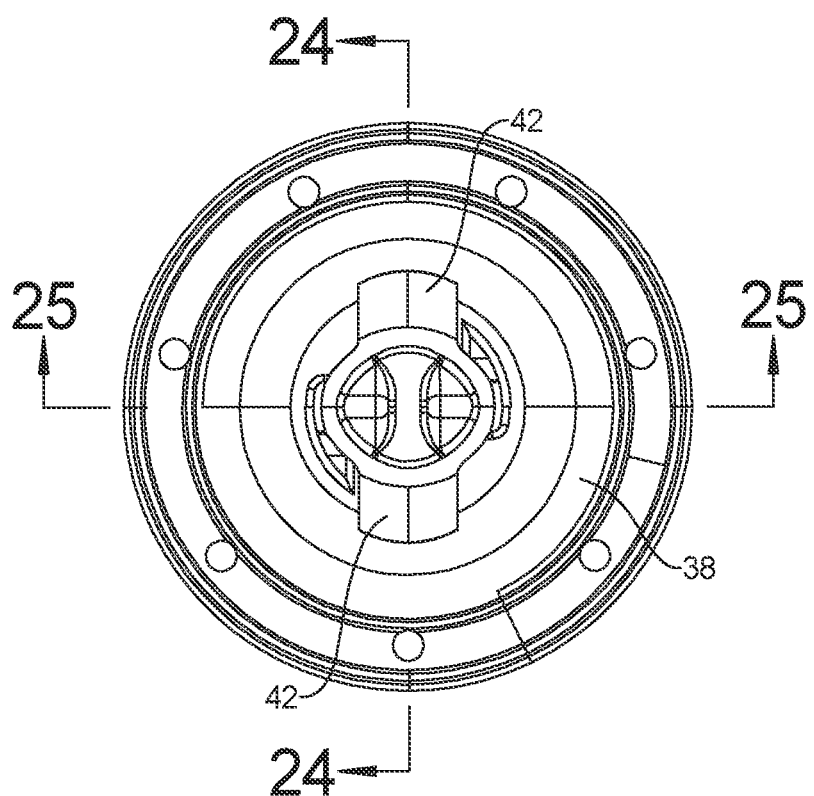
FIG. 23 is a bottom plan view of the example two-piece fastener assembly of FIG. 18.
Figure 24:
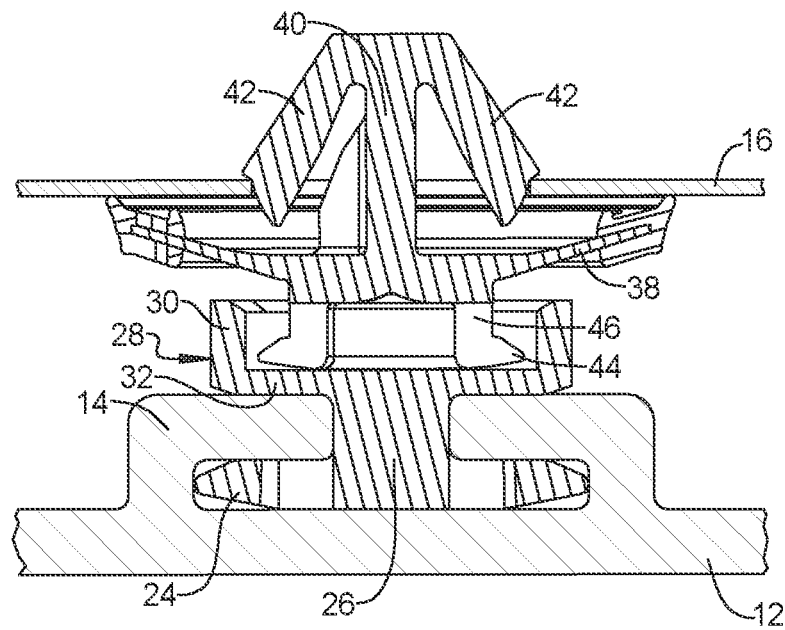
FIG. 24 is a cross-sectional view taken along line 24-24 of FIG. 23 with a portion of the panel and support.
Figure 25:
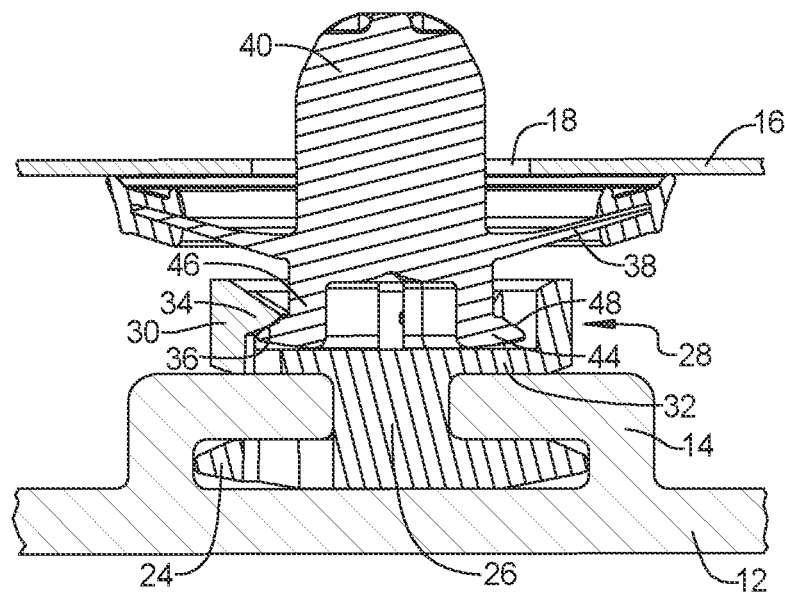
FIG. 25 is a cross-sectional view taken along line 25-25 of FIG. 23 with a portion of the panel and support.
Figure 26:
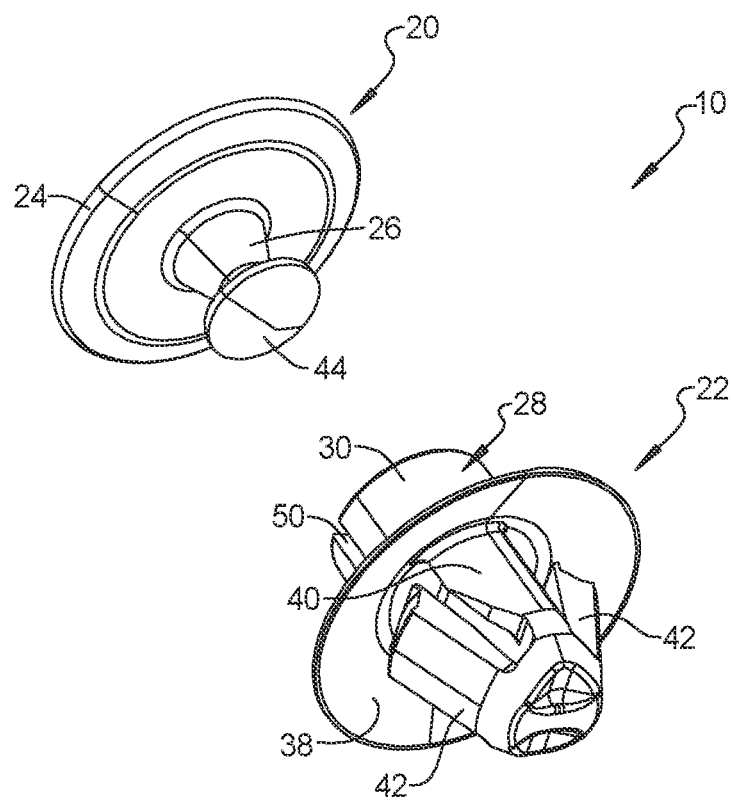
FIG. 26 is a perspective view of a fourth example two-piece fastener assembly in accordance with the present disclosure, with the pieces uncoupled from each other.
Figure 27:
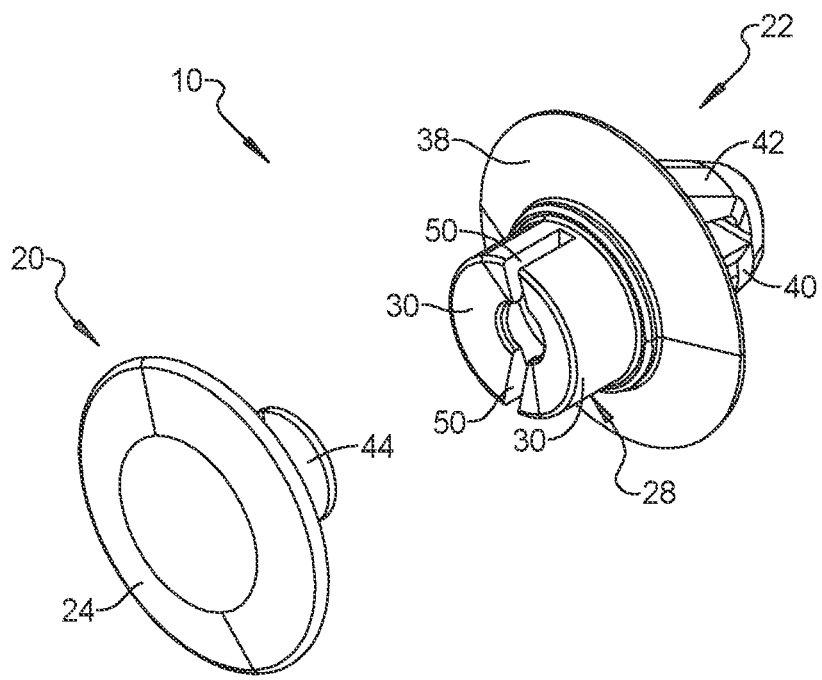
FIG. 27 is another perspective view of the example two-piece fastener assembly of FIG. 26, with the pieces uncoupled from each other.
Figure 28:
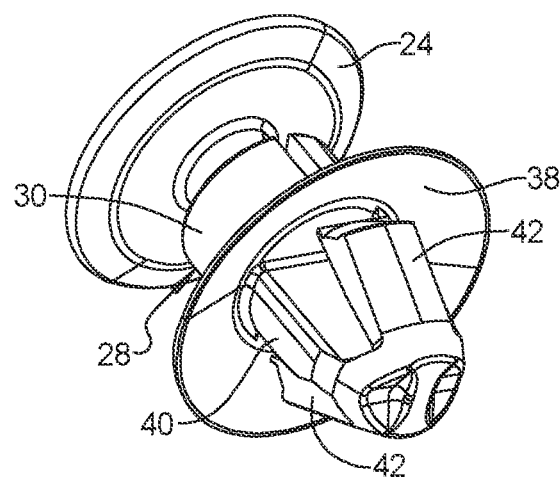
FIG. 28 is a perspective view of the example two-piece fastener assembly of FIG. 26, with the pieces coupled to each other.
Figure 29:
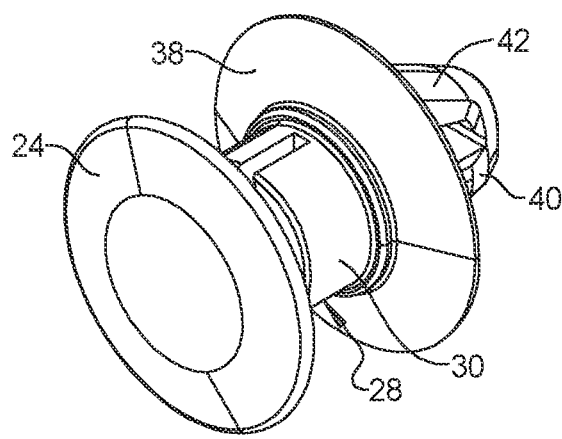
FIG. 29 is another perspective view of the example two-piece fastener assembly of FIG. 26, with the pieces coupled to each other.
Figure 30:
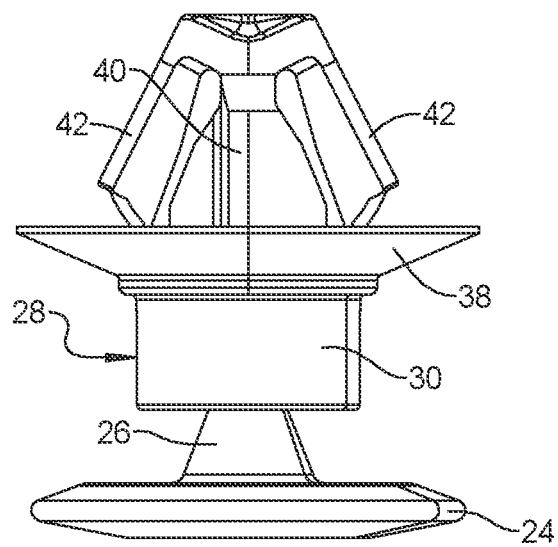
FIG. 30 is a side elevation view of the example two-piece fastener assembly of FIG. 26.
Figure 31:
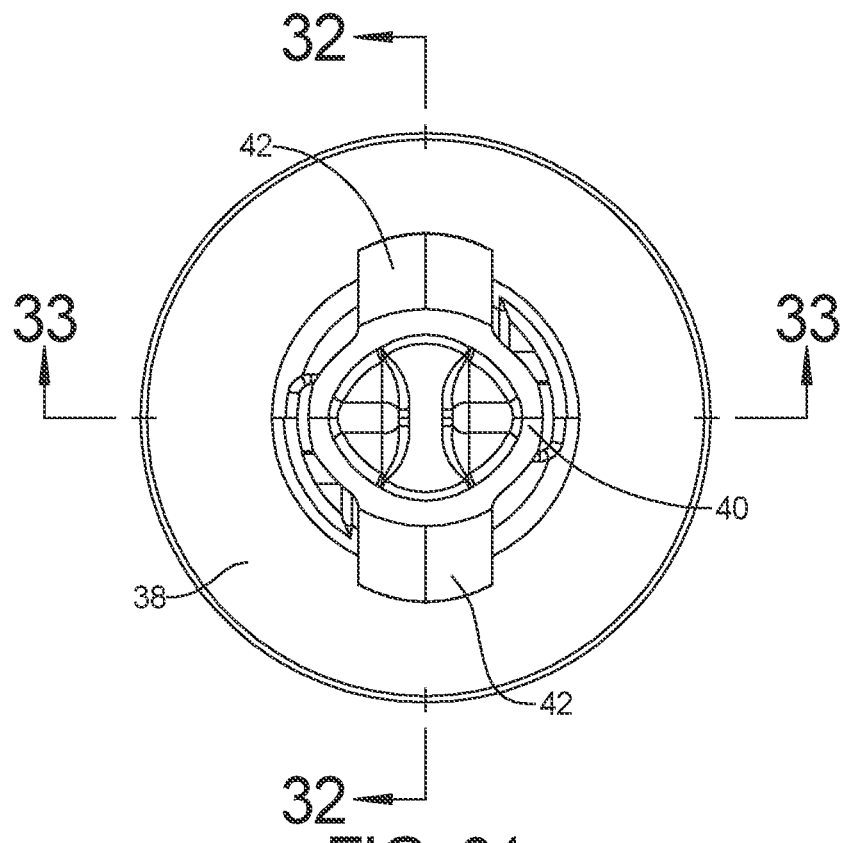
FIG. 31 is a bottom plan view of the example two-piece fastener assembly of FIG. 26.

Example embodiments will now be described more fully with reference to the accompanying drawings.

With reference to FIGS. 1-8, one example of a two-piece fastener assembly 10 for joining a panel 12 having a doghouse 14 to a support 16 having an aperture 18 therein is described below. The two-piece fastener assembly 10 includes a doghouse fastener piece 20 and an aperture fastener piece 22. The doghouse fastener piece 20 can include a doghouse head 24 designed to couple the doghouse fastener piece 20 to the doghouse 14 and a doghouse shaft 26 axially extending from the doghouse head 24. As used herein, the "pieces" are separate, independent components. Thus, each piece, or separate independent component, carries or supports the features or elements of that piece.

The doghouse fastener piece 20 can also include a receiver 28 including an annular wall 30 extending from a base 32. The base 32 of the receiver 28 can have an overall disk or plate shape and can extend from, and be axially supported by, the doghouse shaft 26. The receiver 28 can have a plurality of plate retention arms 34 positioned or extending inwardly from the annular wall 30. Each plate retention arm 34 can provide a plate retention surface 36 facing toward the base 32.

The aperture fastener piece 22 can have an intermediate head 38 and an aperture shaft 40 extending from an aperture side of the intermediate head 38. As examples, the intermediate head 38 can have a disk or plate, or can have an umbrella shape. A plurality of aperture retention arms 42 can extend outwardly away from the aperture shaft 40 and can be designed to retain the support 16 between the retention arms 42 and the intermediate head 38.

The aperture fastener piece 22 can also include a coupling plate 44 that is engaged and retained by the plurality of plate retention arms 34 to couple the doghouse fastener piece 20 and the aperture fastener piece 22 together. The coupling plate 44 can be supported by a plate shaft 46 extending from an opposite, or doghouse side of the intermediate head 38.

Alternatively, the coupling plate 44 can be part of the doghouse fastener piece 20 and the receiver 28 can be part of the aperture fastener piece 22. For example, the coupling plate 44 can be supported by the doghouse shaft 26, and an intermediate head 38 of the aperture fastener piece 22 can form the base 32 of the receiver 28.

As in this example coupling assembly 10 embodiment, the receiver 28 can include three plate retention arms 34 that can be equally spaced around the diameter of the annular wall 30 of the receiver 28. In some cases, the receiver 28 can include two, four, or more of the plate retention arms 34. As in this example coupling assembly 10 embodiment, the plate retention arms 34 can be protrusions that are wider than they are long. As noted above, each plate retention arm 34 can include a plate retention surface 36 facing toward the base 32.

The plate retention arms 34 capture and retain the coupling plate 44, with the plate retention surfaces 36 engaged against a cooperating plate retention surface 48 of the coupling plate 44. In some cases, each of the plate retention surfaces 36 and the cooperating plate retention surface 48 can be oriented or extend at an angle with respect to a plane transverse to the central axis of the fastener 10 that is from any of 0 degrees, 3 degrees, and 5 degrees, to any of 20 degrees, 30 degrees, 40, degrees, 50 degrees and 60 degrees. In most cases, the angle of the plate retention surfaces 36 is different than the angle of the cooperating plate retention surface 48 to facilitate uncoupling of the doghouse fastener piece 20 from the aperture fastener piece 22.

Various additional features or elements can be provided to help tune the coupling and uncoupling forces between the two pieces 20, 22. For example, the annular wall 30 can be formed of a plurality of annular segments that are separated from each other by separations or gaps 50. As in this example coupling assembly 10 embodiment, these separations or gaps 50 can have a pie shape that separates the annular wall 30 into segments. These separations or gaps 50 can additionally extend partially into the base 32.

As another example, a window 52 can extend through the disk or plate shaped base 32 of the receiver 28 adjacent each plate retention arm 34. The size of these windows 52 can be adjusted in order to help tune the coupling and uncoupling forces. For example, larger windows 52 can increase the flexibility of the annular wall 30 carrying the plate retention arms 34, while smaller sized windows 52 tend to reduce the flexibility of the plate retention arms.

As in this example coupling assembly 10 embodiment, the coupling plate 44 can be the relatively rigid coupling component, while the receiver 28 can be the relatively flexible coupling component. In other words, the receiver 28 can provide virtually all of the flexibility necessary to couple and uncouple the doghouse and aperture fastener pieces 20 and 22, respectively.

When using stress concentrating tuning features like the separations or gaps 50 forming the segmented annular wall 30 and the windows 52, it can be desirable to minimize the extent to which plastic deformation of the relatively flexible coupling component occurs during coupling and uncoupling. In some cases, to provide a coupling that can be repeatedly uncoupled and recoupled together, a subsequent uncoupling force can be 80 percent, 90 percent, 95 percent or more of the initial or prior uncoupling force.

As in this example coupling assembly 10 embodiment, the coupling plate 44 can have an annular shape and the coupling plate 44 can be supported by a plate shaft 46 that similarly has an annular shape. The receiver 28 can include a central boss 54 that mates with a central recess 56 of the annular coupling plate 44 and annular plate shaft 46. This mating can be designed to center the coupling plate 44 within the receiver 28 and keep it centered. As a result, the interaction of the coupling plate 44 with the plate retention arms and resulting coupling and uncoupling forces between the pieces 20, 22 can be kept more consistent.

In addition to the coupling plate 44, the base 32, coupling plate 44, and intermediate head 38 can each be plate shaped, which helps minimize or reduce the clearance necessary between the doghouse 14 and the support 16. In addition, the doghouse head 24 can also be plate shaped to further help minimize or reduce the clearance necessary between the panel 12 (from which the doghouse 14 extends) and the support 16. Similarly, the axial length of the doghouse shaft 26 and of the plate shaft 46 can be kept to only the axial length necessary to accommodate the overall assembly. This also helps minimize or reduce the clearance necessary between the doghouse 14 and the support 16.

With reference to FIGS. 9-17, another example of a two-piece fastener assembly 10 for joining a panel 12 having a doghouse 14 to a support 16 having an aperture 18 therein is provided. The same reference numbers are used herein to identify and describe corresponding elements or features in each of the various example embodiments of this disclosure, even if the corresponding elements or features are not identical. In addition, the descriptions of various corresponding elements or features previously provided may not be duplicated herein, despite its applicability to other example embodiments, to reduce or avoid unnecessary repetition thereof.

As in this example coupling assembly 10 embodiment, the doghouse fastener piece 20 can include the receiver 28 and the aperture fastener piece 22 can include the coupling plate 44. In addition, the coupling plate 44 can be the relatively rigid coupling component while the receiver 28 can be the relatively flexible coupling component. This coupling flexibility of the receiver 28 can be provided, at least partially, by the fact that the plate retention surfaces 36 are supported by plate retention arms 34 that are flexible. In other words, the plate retention arms 34 flex or move independent of the supporting annular wall 30 of the receiver 28.

One reason for this relative flexibility of plate retention arms 34 can be the fact that the plate retention arms 34 have an overall length extending away from the annular wall 30 that is greater than the overall cross-sectional width normal to the length direction. Various other features or elements can be provided or adjusted to help tune the flexibility of the plate retention arms 34 and the coupling and uncoupling forces between the two pieces 20, 22. For example, a window 52 can extend through the annular wall 30 of the receiver 28 adjacent each of the flexible plate retention arms 34. Similar to the windows 52 discussed above, the size of these arm adjacent windows 52 can be adjusted in order to help tune the coupling and uncoupling forces.

As another example, each flexible plate retention arm 34 can include a transversely inwardly extending proximal portion 58 and an angled distal portion 60, with the proximal portion 58 coupling the flexible plate retention arm 34 to the annular wall 30 of the receiver 28 and the distal portion 60 of the flexible plate retention arm 34 extending at an angle from and relative to the base or proximal portion 58. The proximal portion 58 can act like a diving board, the size of which can be adjusted in order to help tune the coupling and uncoupling forces. For example, proximal portions 58 with smaller cross-sections and larger lengths can increase the flexibility of the plate retention arms 34 and vice versa. Similarly, the size and angle of the distal portion can be adjusted to adjust the flexibility of the retention arms and to help tune the coupling and uncoupling forces.

A plurality of axially extending grooves 62 can be provided in the annular wall 30 of the receiver 28 to provide additional flexibility to the annular wall 30, and to help tune the coupling and uncoupling forces between the pieces 20, 22. For example, such an axially extending groove 62 in the annular wall 30 can be provided on both or opposite sides of each plate retention arm 30. Each groove 62 provides a thin wall portion, with respect to the adjacent portions of the annular wall 30. Features such as the grooves 62, the windows 52, and the adjacent diving board proximal portion 58 are among the stress concentrating tuning features of this example coupling assembly 10.

As in this example coupling assembly 10 embodiment, a plurality of plate centering ribs 64 can extend radially interiorly from the annular wall 30, which ribs 64 are designed to center the coupling plate 44 within the receiver 28 and keep it centered. As a result, the interaction of the coupling plate 44 with the plate retention arms 34 and resulting coupling and uncoupling forces can be kept more consistent. Additionally or alternatively, the receiver 28 can include a central boss 54 that mates with a central recess 56 of the annular coupling plate 44 and annular plate shaft 46 that is designed to center the coupling plate 44 within the receiver 28 and keep it centered as discussed above.

With reference to FIGS. 18-25, another example of a two-piece fastener assembly 10 for joining a panel 12 having a doghouse 14 to a support 16 having an aperture 18 therein is provided. Consistent with the prior example embodiments 10, the doghouse fastener piece 20 includes the receiver 28, and the aperture fastener piece 22 includes the coupling plate 44. In contrast to the previous example embodiments 10, however, the receiver 28 can be the relatively rigid coupling component while the coupling plate 44 can be the relatively flexible coupling component. In other words, the coupling plate 44 can provide virtually all of the flexibility necessary to couple and uncouple the doghouse and aperture fastener pieces 20 and 22, respectively.

As in this example coupling assembly 10 embodiment, the coupling plate 44 can be formed of a plurality of plate segments, and each plate segment can be supported by a corresponding segment of an annular plate shaft 46. The coupling plate 44 and plate shaft 46 can be separated into segments by gaps 50 so that the coupling plate 44 of the aperture fastener piece 22 can flex inwardly during coupling with the non-flexible plate retention protrusions or arms 34 of the receiver 28 of the doghouse fastener piece 20. As in the illustrated embodiment, the coupling plate 44 and the plate shaft 46 can be separated into two segments. Alternatively, the coupling plate 44 and plate shaft 46 can be separated into three, four, five, or more segments.

As previously noted with respect to the prior embodiments, the coupling plate 44 can alternatively be part of the doghouse fastener piece 20 and the receiver 28 can be part of the aperture fastener piece 22. For example, the coupling plate 44 segments can be supported by annular shaft segments corresponding to the doghouse shaft 26, and the opposite side of the intermediate head 38 of the aperture fastener piece 22 can form the base 32 of the receiver 28.

With reference to FIGS. 26-33, another example of a two-piece fastener assembly 10 for joining a panel 12 having a doghouse 14 to a support 16 having an aperture 18 therein is provided. As previously suggested, in this embodiment the coupling plate 44 can be part of the doghouse fastener piece 20 and the receiver 28 can be part of the aperture fastener piece 22. For example, the coupling plate 44 can be supported by a plate shaft corresponding to the doghouse shaft 26. The receiver 28 can be formed using the opposite side of the intermediate head 38 of the aperture fastener piece 22 as the base 32 of the receiver 28.

The coupling plate can be the relatively rigid component and the receiver 28 can be the relatively flexible coupling component that can provide essentially all of the flexibility necessary to couple and uncouple the two pieces 20, 22. The flexibility of the receiver 28 can be provided by separating the annular wall 30 of the receiver 28 into annular segments separated by gaps 50. As in this embodiment, the plate retention arms 34 can likewise have an annular shape that can be separated in to annular segments by the gaps 50.

Figure 32:
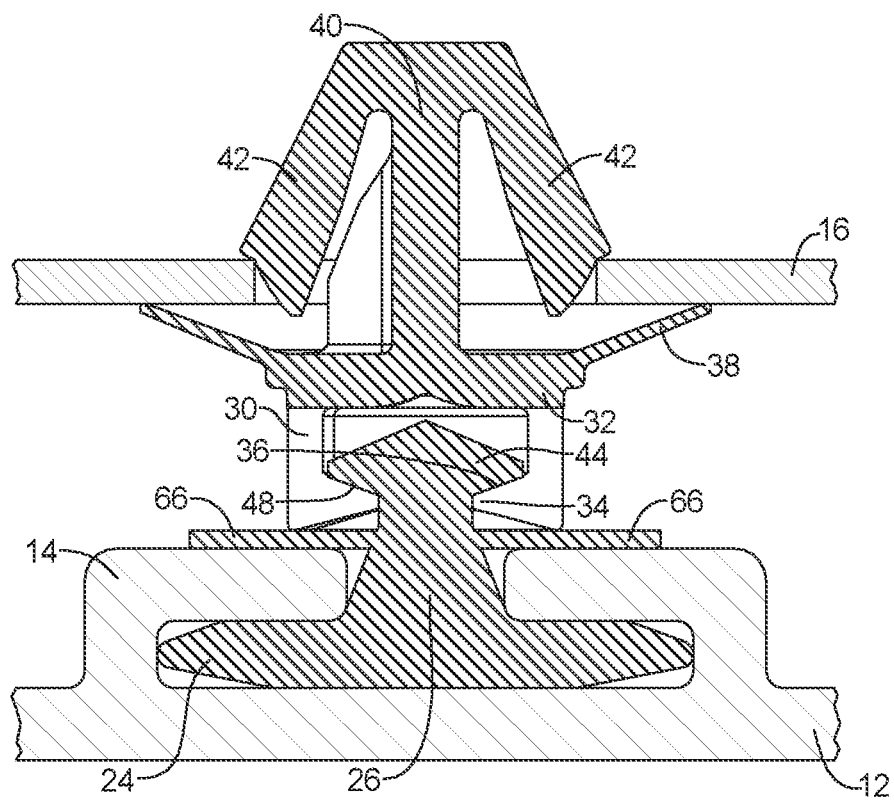
FIG. 32 is a cross-sectional view taken along line 32-32 of FIG. 31 with a portion of the panel and support.
Figure 33:
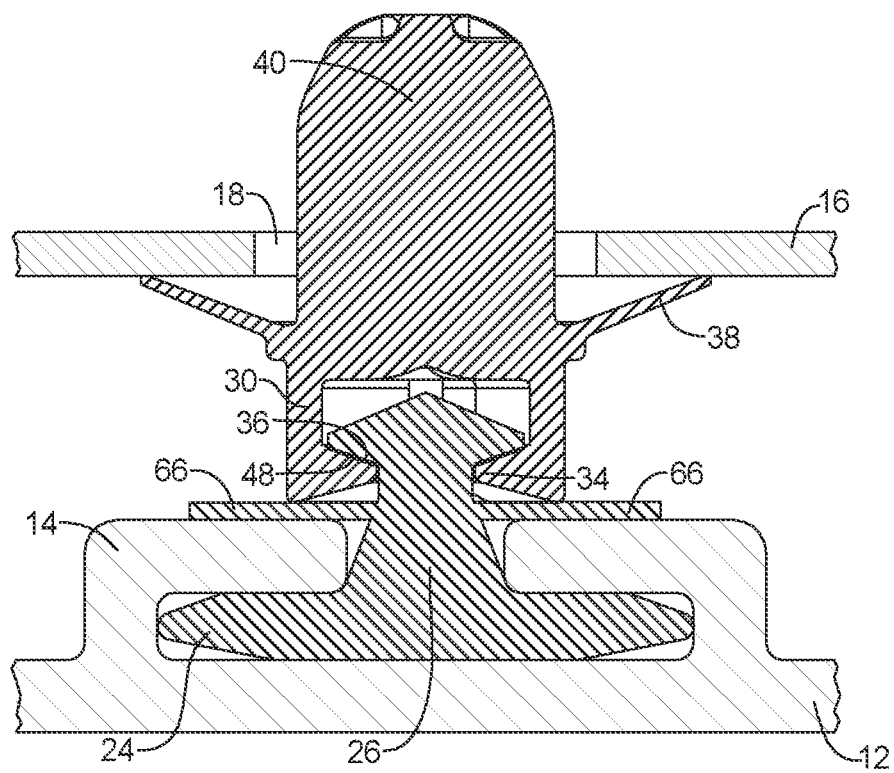
FIG. 33 is a cross-sectional view taken along line 33-33 of FIG. 31 with a portion of the panel and support.
Figure 34:
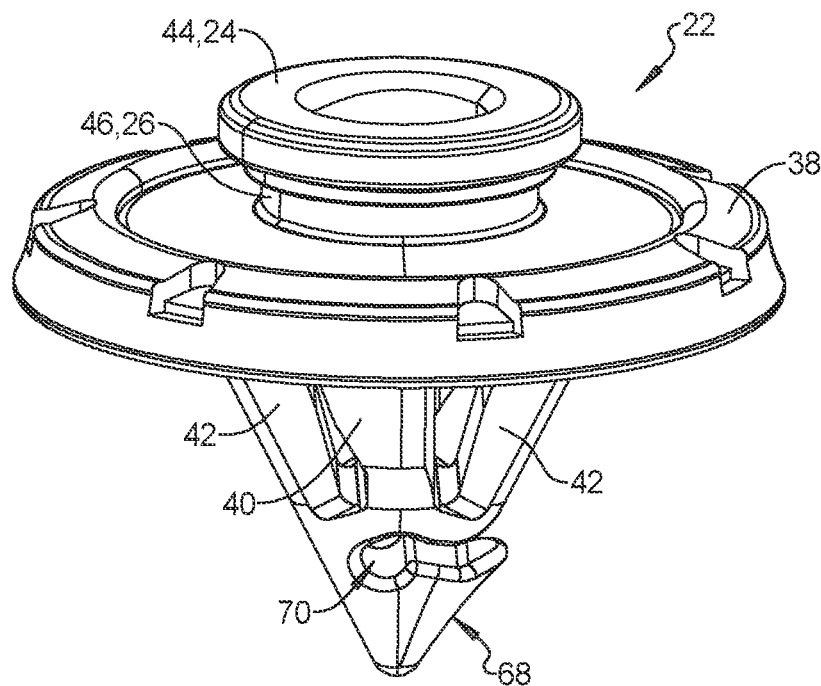
FIG. 34 is a perspective view of an example of a W-base fastener, such as an aperture fastener piece, in accordance with the present disclosure.
Figure 35:
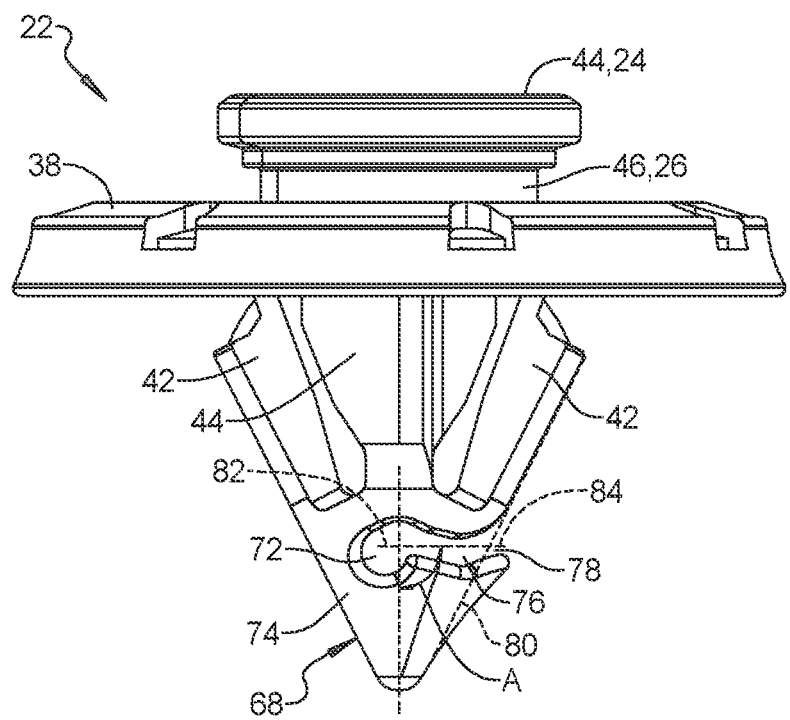
FIG. 35 is a front side elevation view of the example W-base fastener of FIG. 34, which is essentially a mirror image of the opposite back side elevation view.
Figure 36:
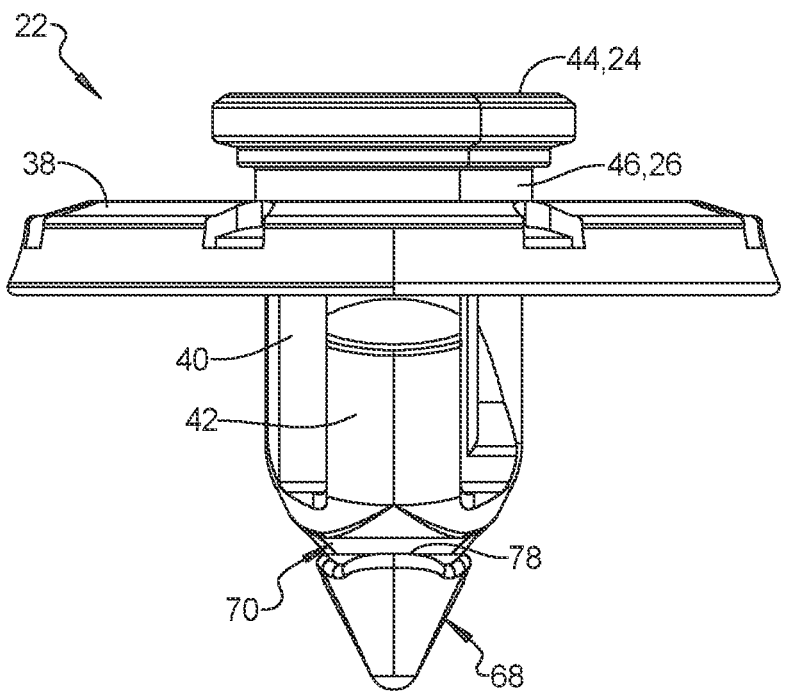
FIG. 36 is a right side elevation view of the example W-base fastener of FIG. 34.
Figure 37:
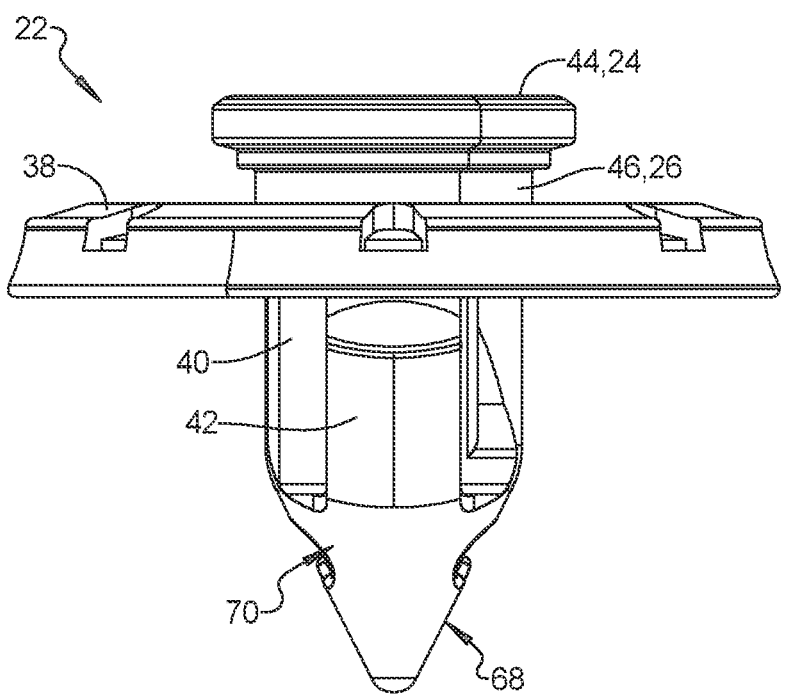
FIG. 37 is a left side elevation view of the example W-base fastener of FIG. 34.
Figure 38:
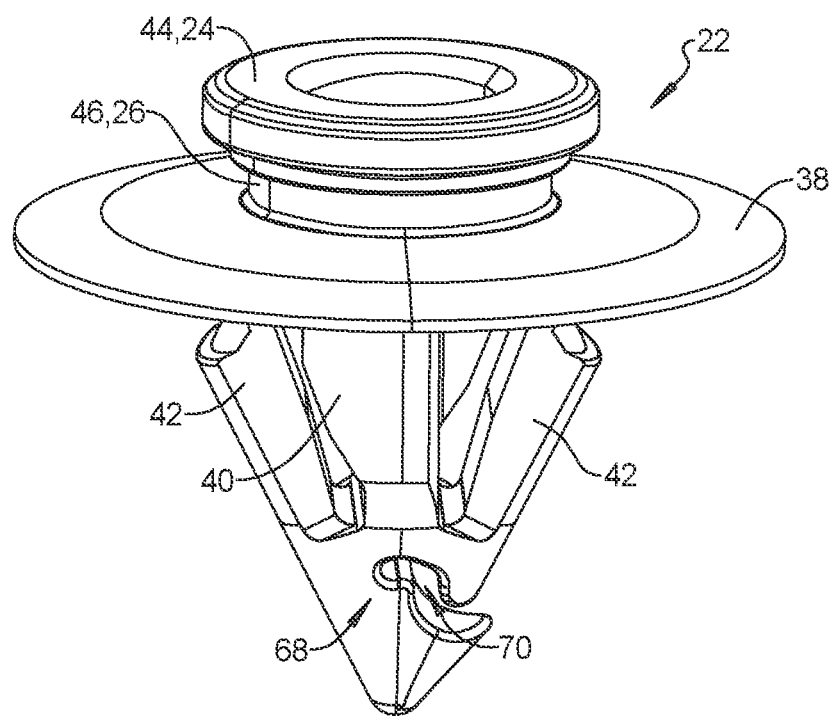
FIG. 38 is a perspective view of another example of a W-base fastener, such as an aperture fastener piece, in accordance with the present disclosure.
Figure 39:
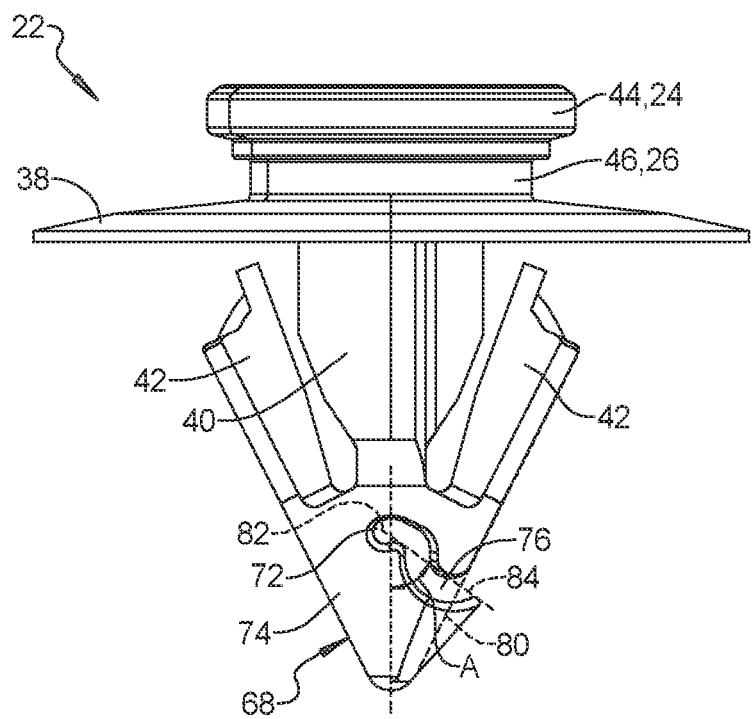
FIG. 39 is a front side elevation view of the example W-base fastener of FIG. 38, which is essentially a mirror image of the opposite back side elevation view.
Figure 40:
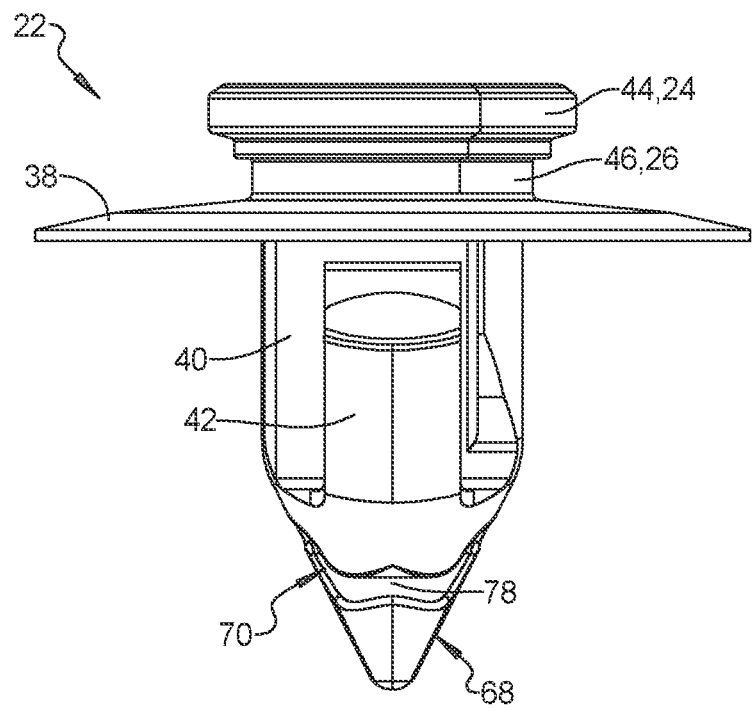
FIG. 40 is a right side elevation view of the example W-base fastener of FIG. 38.
Figure 41:
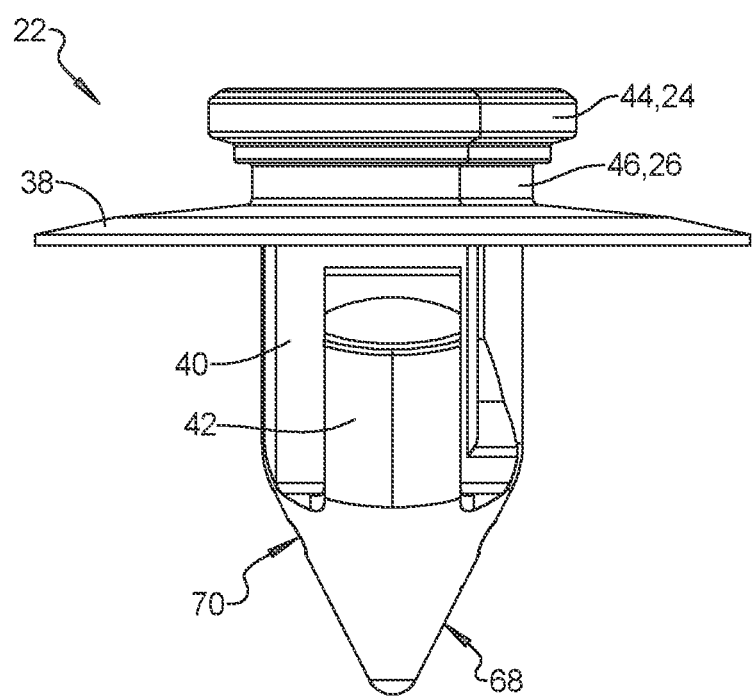
FIG. 41 is a left side elevation view of the example W-base fastener of FIG. 38.

As illustrated in FIGS. 32 and 33, an intermediate annular flange 66 can be added to the doghouse fastener piece 20 in some cases. In some other cases, the axially distal edge of the receiver 28 can engage directly against the doghouse 14. In some cases, a gap or space can be provided between the distal edge of the receiver and the intermediate added flange 66, or the doghouse 14.

As should be apparent, modularity can be provided by preventing a set of doghouse fastener pieces 20 and aperture fastener pieces 22 that share a common receiver 28 and coupling plate 44 connection, but include various configurations and sizes for coupling with different doghouses 14 and apertures 18, respectively.

With reference to FIGS. 34-37, four additional examples of a two-piece fastener assembly 10 for joining a panel 12 having a doghouse 14 to a support 16 having an aperture 18 therein are provided. These additional two-piece fastener assembly 10 examples relate to the examples of each of FIGS. 1-8, 9-17, 18-25, and 26-33, respectively, in which the aperture fastener piece 22 includes an insertion end 68 having an overall conical shape below the aperture retention arms 42 as described hereinafter. In each of these additional two-piece fastener assembly 10 examples, the aperture shaft 40 and aperture retention arms 42 of each of the earlier four aperture fastener piece 22 examples would be replaced with the aperture shaft 40 and the aperture retention arms 42 plus the conically shaped insertion end 68 of FIGS. 34-37.

The insertion end 68 can include an opening 70 extending transversely therethrough. The opening 70 can have a closed interior terminal end 72 positioned to separate a first portion of a first lateral half of the insertion end 68 and to leave a second portion of the first lateral half of the insertion end 68 as a connecting bridge 74 below a first of the aperture retention arms 42. The opening 70 can include a channel 76 extending from the closed interior terminal end 72 to an open exterior terminal end 78 to separate a second lateral half of the insertion end 68 below a second of the aperture retention arms 42. The insertion end 68 below the open exterior terminal end 78 of the channel 76 can extend laterally beyond a straight exterior line 80 defined by laterally outermost points of an outer longitudinal side of the second aperture retention arm 42.

A line extending from a midpoint 82 of a width between a top and bottom of the opening 70 at the closed interior terminal end 72 to a midpoint 84 of a width of the opening 70 at the open exterior terminal end 78 can extend at an angle "A" relative to a central axis of the fastener assembly. In various cases, the angle "A" can be greater than any of 45 degrees, 50 degrees, 60 degrees, 70 degrees, 80 degrees, 90 degrees, 100 degrees, 110 degrees, 120 degrees, and 130 degrees. In some cases, the angle "A" can be up to 135 degrees.

A width between a top and a bottom of the opening 70 at the channel 76 can have a dimension that is designed to close, with the top of the channel 76 contacting the bottom of the channel 76, in response to a removal force being applied to the aperture fastener piece 22.

With reference to FIGS. 38-41, four additional examples of a two-piece fastener assembly 10 for joining a panel 12 having a doghouse 14 to a support 16 having an aperture 18 therein are provided. These additional two-piece fastener assembly 10 examples relate to the examples of each of FIGS. 1-8, 9-17, 18-25, and 26-33, respectively, in which the aperture fastener piece 22 includes an insertion end 68 having an overall conical shape below the aperture retention arms 42 as described hereinafter. In each of these additional two-piece fastener assembly 10 examples, the aperture shaft 40 and aperture retention arms 42 of each of the earlier four aperture fastener piece 22 examples would be replaced with the aperture shaft 40 and the aperture retention arms 42 plus the conically shaped insertion end 68 of FIGS. 38-41.

The discussion above with reference to the two-piece fastener assembly 10 examples of FIGS. 34-37 is likewise applicable here. Compared to the embodiments of FIGS. 34-37, the channel 76 of the opening 70 of the insertion end 68 of the embodiments of FIGS. 38-41 is more circuitous and less direct between the closed interior terminal end 72 and the open exterior terminal end 78.

Aperture fastener pieces 22 including an aperture shaft 40 and a plurality of aperture retention arms 42 that extending from a head, such as intermediate head 38, are referred to in the art as W-base fasteners. Thus, each of the example aperture fastener pieces 22 of the two-piece fastener assemblies 10 described above are W-base fasteners 22.

In addition, the examples of each of FIGS. 34-37 and FIGS. 38-41 can be incorporated into any other W-base fastener 22, including single-piece fasteners. In some cases, such single-piece W-base fasteners 22 can be designed to couple two components together, at least one of which has an aperture therethrough. Some of such single-piece W-base fastener 22 examples can include the aperture shaft 40 and a plurality of aperture retention arms 42 and the insertion end 68 extending from a single head in place of the intermediate head 38. For example, the aperture retention arms 42 can be positioned relative to the single head 38 and otherwise designed to pass through and to retain the at least one of the two components between the aperture retention arms 42 and the single head 38. In such examples, there would be no plate shaft 46 and the coupling plate 44 extending from the single head 38.

Other of such single-piece W-base fastener 22 examples can involve replacing the plate shaft 46 and the coupling plate 44 extending from the intermediate head 38 with the doghouse shaft 26 and doghouse head 24, respectively, extending from the intermediate head 38. In some cases, the single-piece W-base fastener 22 can be designed to join a panel having a doghouse to a support having an aperture therein. In such examples, the receiver 28, coupling plate 44 and plate shaft 46 between the intermediate head 38 and the doghouse shaft 26 and doghouse head 24 would be eliminated to create a single-piece W-base fastener 22, including both the aperture retention components and the doghouse retention components. Such examples can enable a panel 12 having a doghouse 14 to be joined to a support 16 having an aperture 18 therein using a single-piece W-base fastener 22.

As used herein, "a straight exterior line defined by laterally outermost points of an outer longitudinal side of the second aperture retention arm" refers to the most laterally outward line extending below the second aperture retention arm that is possible from connecting two points along the outer longitudinal side of the second aperture retention arm in a plane extending through the central axis of the two-piece fastener assembly 10, or the single-piece W-base fastener 22, as the case may be. Such a line will not extend through any interior portion of the second aperture retention arm. As used herein, "overall conical shape" includes conical shapes that have circular, oval, elliptical, and similar shapes in transverse cross-section, whether the cross-sectional shapes are defined by an arcuate boundary, multifaceted segments, or combinations thereof.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A single-piece W-base fastener designed to join a first component having an aperture to a second component, the single-piece W-base fastener comprising:
   a head;
   an aperture shaft extending from a bottom side of the head;
   a plurality of aperture retention arms extending outwardly away from the aperture shaft and being designed to retain the first component between the aperture retention arms and the bottom side of the head; and
   an insertion end positioned below the aperture retention arms and having an overall conical shape, the insertion end including an opening therethrough, the opening having a closed interior terminal end positioned to separate a first portion of a first lateral half of the insertion end and to leave a second portion of the first lateral half of the insertion end as a connecting bridge below a first of the aperture retention arms, and the opening including a channel extending from the closed interior terminal end to an open exterior terminal end to separate a second lateral half of the insertion end below a second of the aperture retention arms, the insertion end below the open exterior terminal end of the channel extending laterally outwardly beyond a straight exterior line defined by laterally outermost points of an outer longitudinal side of the second of the aperture retention arms.

2. The single-piece W-base fastener of claim 1, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 45 degrees and 135 degrees.

3. The single-piece W-base fastener of claim 1, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 50 degrees and 90 degrees.

4. The single-piece W-base fastener of claim 1, wherein the closed interior terminal end of the opening is spaced a first distance from the bottom side of the head, and the open exterior terminal end is spaced a second distance from the bottom side of the head that is greater than the first distance.

5. The single-piece W-base fastener of claim 1, wherein a width between a top and a bottom of the opening at the channel has a dimension that is designed to close, with the top of the opening at the channel contacting the bottom of the opening at the channel, in response to a removal force being applied to the fastener.

6. The single-piece W-base fastener of claim 5, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 45 degrees and 135 degrees.

7. The single-piece W-base fastener of claim 5, wherein the closed interior terminal end of the opening is spaced a first distance from the bottom side of the head, and the open exterior terminal end is spaced a second distance from the bottom side of the head that is greater than the first distance.

8. The single-piece W-base fastener of claim 1, further comprising a doghouse shaft extending from an upper side of the head, which upper side is opposite the bottom side of the head, and the doghouse shaft supporting a doghouse head, which doghouse head is designed to couple with a doghouse of the second component.

9. The single-piece W-base fastener of claim 8, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 45 degrees and 135 degrees.

10. The single-piece W-base fastener of claim 8, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 50 degrees and 90 degrees.

11. The single-piece W-base fastener of claim 8, wherein the closed interior terminal end of the opening is spaced a first distance from the bottom side of the head, and the open exterior terminal end is spaced a second distance from the bottom side of the head that is greater than the first distance.

12. The single-piece W-base fastener of claim 8, wherein a width between a top and a bottom of the opening at the channel has a dimension that is designed to close, with the top of the opening at the channel contacting the bottom of the opening at the channel, in response to a removal force being applied to the fastener.

13. The single-piece W-base fastener of claim 12, wherein a line extending from a midpoint of a width between a top and bottom of the channel at the closed interior terminal end to a midpoint of a width of the channel at open exterior terminal end extends at an angle "A" relative to a central axis of the fastener and the angle "A" is between 45 degrees and 135 degrees.

14. The single-piece W-base fastener of claim 12, wherein the closed interior terminal end of the opening is spaced a first distance from the bottom side of the head, and the open exterior terminal end is spaced a second distance from the bottom side of the head that is greater than the first distance.

15. The single-piece W-base fastener of claim 1, further comprising a coupling extending from an upper side of the head, which upper side is opposite the bottom side of the head, which coupling is designed to couplable to another piece having a doghouse head that is designed to couple with a doghouse of the second component.

\* \* \* \* \*